United States Patent [19]

Skorpenske et al.

[11] Patent Number: 5,618,854
[45] Date of Patent: Apr. 8, 1997

[54] COMBUSTION-MODIFIED FLEXIBLE POLYURETHANE FOAMS

[75] Inventors: Richard G. Skorpenske; Alan K. Schrock, both of Lake Jackson, Tex.

[73] Assignee: The Dow Chemical Company, Midland, Mich.

[21] Appl. No.: 390,391

[22] Filed: Feb. 16, 1995

Related U.S. Application Data

[63] Continuation of Ser. No. 304,991, Sep. 13, 1994, abandoned, which is a continuation of Ser. No. 30,748, Mar. 12, 1993, abandoned, which is a continuation-in-part of Ser. No. 646,140, Jan. 25, 1991, abandoned.

[51] Int. Cl.$^6$ .................................................. C08G 18/32
[52] U.S. Cl. .............. 521/164; 252/182.24; 252/182.25; 252/182.26; 252/609; 521/128; 521/129; 521/137; 521/167; 521/170; 521/171; 521/172; 521/173; 521/174; 521/176
[58] Field of Search ......................... 252/182.24, 182.25, 252/182.26, 609; 521/110, 112, 129, 163, 164, 167, 128, 137, 170, 171, 172, 173, 174, 176

[56] References Cited

U.S. PATENT DOCUMENTS

| | | | |
|---|---|---|---|
| 4,722,942 | 2/1988 | Nichols et al. | 521/110 |
| 5,198,473 | 3/1993 | Gallagher et al. | 521/99 |

FOREIGN PATENT DOCUMENTS

| | | |
|---|---|---|
| 0210566 | 7/1986 | European Pat. Off. . |
| 210566 | 2/1987 | European Pat. Off. . |
| 987354 | 3/1965 | United Kingdom . |
| 2163762 | 12/1987 | United Kingdom . |

*Primary Examiner*—James J. Seidleck
*Assistant Examiner*—John M. Cooney, Jr.

[57] ABSTRACT

Disclosed is an active hydrogen-containing composition suitable for the production of flexible polyurethane foam when reacted with a polyisocyanate, said composition comprising,
  (a) a polyol having an average functionality of about 2.0 to about 4.0, and an equivalent weight in the range of from about 500 to about 5000;
  (b) from about 0.5 to about 5 parts, per 100 parts by weight of component (a), of a crosslinker selected from the group consisting of monoethanolamine, diethanolamine, triethanolamine, monoisopropanolamine, diisopropanolamine, methylene bis(o-chloroaniline) and mixtures thereof; and
  (c) from about 0.3 to about 15 parts per 100 parts by weight of component (a), of a compound having at least 3 hydroxyl groups, at least two of which are secondary hydroxyl groups; and an equivalent weight of less than about 500;
as well as flexible polyurethane foams prepared therefrom. The active hydrogen-containing composition of the invention has been discovered to be useful in the production of polyurethane foams which pass certain standard laboratory flammability tests.

16 Claims, No Drawings

COMBUSTION-MODIFIED FLEXIBLE POLYURETHANE FOAMS

CROSS-REFERENCE TO RELATED APPLICATION

This is a continuation of application Ser. No. 08/304,991, filed Sep. 13, 1994 which is now abandoned, which is a continuation of application Ser. No. 08/030,748 filed Mar. 12, 1993 now abandoned which is a continuation in part of Ser. No. 07/646,140 filed Jan. 25, 1991, now abandoned.

BACKGROUND OF THE INVENTION

This invention relates to flexible polyurethane foams, more particularly to flexible polyurethane foams which exhibit excellent flame resistance in small scale burn testing. The terms "combustion-modified," "flame resistant" and similar terms as used herein refer to a material's performance in laboratory flammability tests, and are not meant to describe performance under actual fire conditions.

Flexible polyurethane foams are widely used as cushioning material in, for example, furniture, automobile seating, impact-reducing medias, and the like. One concern regarding the use of these foams is their performance under fire conditions, particularly their ability to resist igniting and to extinguishing themselves when exposed to flame.

Many attempts have been made to reduce the flammability of polyurethane foams. The most common method is to incorporate a halogenated compound or phosphate ester flame retarding agent into the foam formulation. These agents have been somewhat successful in reducing the flammability of the foams. However, the use of these flame retarding agents has several substantial drawbacks. Although they are somewhat successful in suppressing flames, under fire conditions they decompose to form toxic gases, particularly gaseous halogen-containing compounds such as HCl and HBr. Foams containing these agents, although they resist flames, sometimes smolder during fires. In preparing the foams, the halogenated flame retarding agents often discolor the interior of the foam, and/or lead to degradation of the foam properties. In addition, these flame retardants deactivate many of the catalysts used in foam formulations. Moreover, many companies do not like to introduce halogenated compounds into the workplace for fear of worker exposure. In addition, relatively large quantities of these agents must be used in order to obtain satisfactory results, adding significantly to the cost of the foam.

Other types of flame retardant additives are described in U.S. Pat. No. 4,722,942, which discloses the use of fire retardant additives comprising hydroxyl-terminated alkanes having a plurality of primary hydroxyl groups and alkylene ethers and polyethers having a plurality of primary hydroxyl groups. However, the primary hydroxyl-containing compounds described above are often incompatible with the high molecular weight polyols used in the preparation of polyurethane foams. In addition, such primary hydroxyl-containing compounds may also restrict cell-opening during the manufacture of the foam.

In view of the foregoing, it would be desirable to provide a polyurethane foam containing a flame retarding additive which does not release halogen-containing gases when burned, which does not present the processing and exposure problems associated with the halogenated and phosphate ester agents, and which is compatible with the high molecular weight polyols used in the preparation of polyurethane foams.

SUMMARY OF THE INVENTION

This invention is in one aspect an active hydrogen-containing composition suitable for the production of flexible polyurethane foam when reacted with a polyisocyanate, said composition comprising,
(a) a polyol having an average functionality of about 2.0 to about 4.0, and an equivalent weight in the range of from about 500 to about 5000;
(b) from about 0.5 to about 5 parts, per 100 parts by weight of component (a), of a crosslinker selected from the group consisting of monoethanolamine, diethanolamine, triethanolamine, monoisopropanolamine, diisopropanolamine, methylene bis(o-chloroaniline) and mixtures thereof; and
(c) from about 0.3 to about 15 parts per 100 parts by weight of component (a), but no less than 15 meq. per 100 grams of component (a), of a compound having at least 3 hydroxyl groups, at least two of which are secondary hydroxyl groups; and an equivalent weight of less than about 500.

In another aspect, this invention is a flexible polyurethane foam prepared by reacting a polyisocyanate with the active hydrogen-containing composition of this invention, in the presence of a blowing agent.

The foam prepared with the active hydrogen-containing compositions of this invention exhibits excellent flame resistance, as determined according to burn testing described hereinafter. Because the flame retarding additive used in this invention is not halogenated or a phosphate ester, it does not emit halogen-containing fumes when burned. The flame retarding additive used herein does not cause significant discoloration of the foam upon production and is relatively free of other processing problems which are caused by halogen compounds and phosphate esters. The secondary-hydroxyl compounds of the invention are more compatible and storage stable with relatively high equivalent weight polyols commonly used in polyurethane foam-forming reactions than comparable primary hydroxyl-containing compounds. Moreover, the use of the secondary-hydroxyl containing compounds permit a greater degree of cell opening during the manufacture of the foam than comparable primary hydroxyl-containing compounds.

DETAILED DESCRIPTION OF THE INVENTION

The active hydrogen-containing composition of this invention comprises a relatively high equivalent weight polyol as further described herein, a certain crosslinker compound, and a compound having secondary hydroxyl groups.

The polyol employed herein is characterized by having an average functionality of about 2 to about 4, preferably about 2 to about 3. In addition, preferably at least about 10 percent, and more preferably at least about 20 percent of the reactive hydroxyl groups contained in the polyol are primary hydroxyls. The polyol has an equivalent weight from about 500 to about 5000, preferably about 800 to about 3000, more preferably about 1000 to about 2000.

Suitable polyols include, for example, polyether polyols, polyester polyols, poly(alkylene carbonate)polyols, hydroxyl-containing polythioethers, polymer polyols, and mixtures thereof. Polyether polyols are well-known in the art and include, for example, polyoxyethylene and polyoxypropylene diols and triols which are prepared by reacting an unsubstituted or halogen- or aromatic-substituted ethylene oxide or propylene oxide with an initiator compound containing two or more active hydrogen groups such as water, ammonia, a polyalcohol, or an amine. Such methods are described, for example, in U.S. Pat. Nos. 4,269,945, 4,218,543, and 4,374,210, which are hereby incorporated by reference in their entirety. In general, polyether polyols may be prepared by polymerizing alkylene oxides in the presence of an active hydrogen-containing initiator compound. Most preferred, however, are ethylene oxide-capped polyols prepared by reacting an initiator compound, such as glycerine with propylene oxide or a mixture of ethylene oxide and propylene oxide, followed by reacting with ethylene oxide.

Suitable alkylene oxides include ethylene oxide, propylene oxide, butylene oxides, styrene oxide, epichlorohydrin, epibromohydrin, and mixtures thereof. Suitable initiator compounds include water, ethylene glycol, propylene glycol, butanediol, hexanediol, glycerin, trimethylol propane, pentaerythritol, hexanetriol, sorbitol, sucrose, hydroquinone, resorcinol, catechol, bisphenols, novolac resins, phosphoric acid, amines, and mixtures thereof.

Polyester polyols are also well-known in the art and may be prepared by reacting a polycarboxylic acid or anhydride thereof with a polyhydric alcohol. Examples of suitable polycarboxylic acids include succinic acid, adipic acid, suberic acid, azelaic acid, sebacic acid, phthalic acid, isophthalic acid, maleic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, maleic acid anhydride, glutaric acid anhydride, fumaric acid, and mixtures thereof. Examples of suitable polyhydric alcohols include ethylene glycols, propane diols, butane diols, 1,6-hexanediol, 1,8-octanediol, neopentylglycol, glycerol, trimethylol propane, pentaerythritol, quinitol, mannitol, sorbitol, methyl glycoside, diethylene glycol, triethylene glycol, tetraethylene glycol, polyethylene glycols, polypropylene glycols, and mixtures thereof.

Among the useful polymer polyols are included dispersions of polymers of vinyl monomers in a continuous polyol phase, particularly dispersions of styrene/acrylonitrile copolymers. Also useful are the so-called polyisocyanate polyaddition (PIPA) polyols (dispersions of polyurea-polyurethane particles in a polyol) and the polyurea dispersions in polyols (PHD polyols). Copolymer polyols of the vinyl type are described, for example, in U.S. Pat. Nos. 4,390,645, 4,463,107, 4,148,840 and 4,574,137, all incorporated by reference. Preferred are polyether polyols and copolymer polyols of the vinyl type, particularly styrene/acrylonitrile dispersions.

Most preferred are poly(propylene oxide)polyols having 2–3 hydroxyl groups per molecule, which are end-capped with ethylene oxide so at least about 50 percent use of the hydroxyl groups are primary hydroxyls, and/or polyols comprising styrene/acrylonitrile dispersions containing about 3–45 weight percent dispersed particles in said poly(propylene oxide) polyols.

In addition to the polyol, the active hydrogen-containing composition comprises a crosslinker which is selected from the group consisting of monoethanolamine, diethanolamine, triethanolamine, monoisopropanolamine, diisopropazolamine, methylene bis(o-chloroaniline) and mixtures thereof. Of these, diethanolamine is preferred due to its relatively low toxicity and generally good performance. About 0.5 to about 5, preferably about 1 to about 3, more preferably about 1 to about 2.5, parts by weight of the crosslinker are used per 100 parts by weight of the polyol. This particular type of crosslinker is employed in order to produce a foam with a high degree of resiliency.

Also included in the active hydrogen-containing composition is a compound having at least 3 hydroxyl groups; at least two of which are secondary hydroxyl groups and an equivalent weight of less than about 500, preferably less than about 300. Preferably, the flame retarding additive is a liquid or is miscible in the other components of the active hydrogen-containing composition. These compounds may be prepared in processes similar to those described above for the preparation of polyols. In general, these compounds may be prepared by polymerizing propylene oxide, butylene oxide, mixtures thereof, or mixtures of propylene oxide and/or butylene oxide with ethylene oxide, in the presence of an initiator compound with a functionality of 3 or greater, or by reacting a primary hydroxyl-terminated compound with propylene oxide or butylene oxide. Preferably, the active hydrogen-containing compound contains at least three secondary hydroxyl groups.

The equivalent weight of the compounds is at least about 50, more preferably at least about 80, and most preferably at least about 83; and is preferably no greater than about 300, more preferably no greater than about 200, even more preferably no greater than about 150, and most preferably no greater than about 100.

Examples of such compounds include [di-(2-hydroxypropyl)-di(2-hydroxypropoxypropyl)-hydrazine], [tetra(hydroxypropoxypropoxypropyl)-hydrazine], [tetra-(propoxypropoxypropoxypropoxyhydroxypropyl)-hydrazine]. These compounds are commercially available from Olin Chemical Co., sold as corrosion inhibitors under the trade name "Oxypruf™." Other examples include low molecular weight secondary-hydroxyl terminated polyols sold under the trade name "Voranol" by The Dow Chemical Company, such as a glycerine-initiated polypropyleneoxy polyol with a molecular weight of about 250, and an amino ethyl ethanolamine-initiated polypropyleneoxy polyol with a molecular weight of about 280. Preferably, the compound is a glycerine-initiated polypropyleneoxy polyol with a molecular weight of about 250, and an aminoethyl-ethanolamine-initiated polypropyleneoxy polyol with a molecular weight of about 280, and most preferably is a glycerine-initiated polypropyleneoxy polyol with a molecular weight of about 250.

The compound is employed in an amount of from 5 to about 50 milliequivalents (meq.) of compound per 100 grams polyol. The compound is preferably employed in an amount of at least about 5.5 meq., more preferably at least about 15 meq.; and is preferably no greater than about 27.5 meq., more preferably no greater than about 20 meq., per 100 grams polyol. These amounts generally equate to about 0.3 to about 15 parts by weight of the compound per 100 parts by weight polyol. The specific amounts which are most preferable will obviously depend on the equivalent weight of the compound. If the compound is a lower equivalent weight compound, it is preferably employed in an amount of about 1–6, more preferably about 1–4 parts per 100 parts by weight polyol. If the compound is a higher equivalent weight compound, it is preferably employed in an amount of about 4–12, more preferably about 4–10, parts by weight of polyol.

The active hydrogen containing composition of this invention may also contain additives such as mold release agents, blowing agents, pigments and other colorants, preservatives, catalysts, antioxidants, surfactants, fillers, and the like. In making slabstock foams, the various components are normally mixed at a mixing head immediately prior to foaming. In this instance as well, these various optional additives are often useful.

Suitable blowing agents include any material which is capable of generating a gas under the conditions of the reaction of a polyisocyanate and a polyol. Such materials include, for example, water, low boiling halogenated alkanes, the so-called "azo" blowing agents such as azobis(formamide), finely divided solids, air, carbon dioxide, formic acid, nitrogen or other inert gases, and the like. Preferred are water and the low boiling halogenated alkanes. Exemplary low boiling halogenated alkanes include methylene chloride, monochloromonofluoromethane, dichloromonofluoromethanes, trichloromonofluoromethane, monochlorodifluoromethane, monochlorotrifluoromethane and the like. The use of such blowing agents is well-known in the art. The amount of blowing agent used is sufficient to provide a cellular structure to the foam. Preferably, the foam has a density of less than about 10, more preferably less than about 5, most preferably about 1 to about 3.5 pounds per cubic foot. To obtain such densities using only water as the blowing agent, about 0.2 to about 5, preferably about 2 to about 4.5 parts of water are advantageously used per 100 parts polyol. When halogenated alkanes are the sole blowing agent, such densities are provided using about 5 to about 50 parts of a halogenated alkane per 100 parts of polyol. A mixture of a halogenated alkane with water can also be used.

Suitable surfactants include the diverse silicone surfactants, preferably those which are block copolymers of a polysiloxane and a poly(alkylene oxide). Suitable such surfactants include L-5303, L-5305, L-520, L-540 and Y-10184 surfactants, available from Union Carbide Corporation, BF-2370, BF-2270, B-8014, B-8017, B-8200, B-8614 and BF-4813, available from Goldschmidt Chemicals, DC-190, DC-196, DC-X2-5043 and DC-1372, available from Dow Corning Corporation, and the like. Non-silicone surfactants such as poly(alkylene oxides) can also be used. Mixtures of such surfactants can also be used. The surfactant is used in an amount sufficient to stabilize the foaming reaction mixture against collapse until the foam is cured, and to promote the formation of a somewhat uniform cell structure. When present, about 0.1 to about 5, preferably about 0.2 to about 2 parts by weight of surfactants are typically employed per 100 parts of polyol.

Catalysts for preparing flexible polyurethane foams principally include organometallic catalysts and tertiary amine compounds. Suitable catalysts are described, for example, in U.S. Pat. No. 4,495,081, incorporated herein by reference. Of the organometallic compounds, organotin, organolead, organobismuth, organomercury and organoiron catalysts, especially organotin catalysts are generally preferred. Exemplary organotin catalysts include stannous octoate, dibutyltin dilaurate, dibutyltinacetate, dimethyltindilaurate and dimethyltindiacetate. Exemplary tertiary amine catalysts include triethylenediamine, bis(N,N-dimethylaminoethyl)ether, di(N,N-dimethylaminoethyl)amine, and the like. When using such catalysts, an amount sufficient to increase the rate of the various urethane-foaming and foaming reaction is used. Typically, about 0.001 to about 0.5, preferably about 0.002 to about 0.1, more preferably about 0.002 to about 0.01 part of an organometallic catalyst is used per 100 parts of polyol. Tertiary amine containing compounds are used in amounts ranging from about 0.1 to about 3, preferably about 0.1 to about 1, more preferably about 0.2 to about 0.6 parts per 100 parts of polyol.

Suitable pigments and fillers include, for example, calcium carbonate, graphite, carbon black, iron oxide, titanium dioxide, alumina trihydrate and the like.

Suitable mold release agents include internal mold release agents such as described, for example, in U.S. Pat. No. 4,585,803 to Nelson et al. incorporated herein by reference.

The active hydrogen-containing compositions are reacted with a polyisocyanate under conditions such that a flexible polyurethane foam is obtained. The polyisocyanate employed herein is an organic compound having an average of at least about 2.0 isocyanate groups per molecule. The isocyanate groups can be attached to aromatic or aliphatic carbon atoms. Suitable polyisocyanates are described, for example, in U.S. Pat. Nos. 4,065,410, 3,401,180, 3,454,606, 3,152,162, 3,492,330, 3,001,973; 3,394,164 and 3,124,605, all incorporated herein by reference.

Especially suitable aromatic polyisocyanate include 2,4- and/or 2,6-toluenediisocyanate (TDI), 2,4'- and/or 4,4'-diphenylmethanediisocyanate (MDI), p-phenylenediisocyanate, polymethylenepolyphenylpolyisocyanates, mixtures thereof and the like. Also useful are polymeric derivatives of MDI containing biuret and/or carbodiimide linkages. Other derivatives of the aforementioned polyisocyanates, including those containing isocyanurate and/or oxazolidone groups, can also be used herein. However, it is preferred to employ polyisocyanates having from about 1–4, preferably about 2–3, isocyanate groups per molecule. The toluenediisocyanate isomers are most preferred.

Useful aliphatic polyisocyanates include the hydrogenated derivatives of the foregoing aromatic polyisocyanates as well as hexamethylenediisocyanate, isophoronediisocyanate, 1,4-cyclohexanediisocyanate and the like.

Prepolymers and quasi-prepolymers of the foregoing polyisocyanates are also useful herein as the polyisocyanate.

The polyisocyanate is advantageously used in an amount sufficient to provide about 0.8 to about 1.5, preferably about 0.95 to about 1.15, more preferably about 1.0 to about 1.1 isocyanate groups per active hydrogen-containing group present in the reaction mixture.

A molded polyurethane foam is advantageously prepared according to this invention by blending the polyol, crosslinker, flame retarding additive, and optional components, if any, to form an active hydrogen-containing composition. This composition is then mixed with a polyisocyanate and the mixture placed into a suitable mold. If desired, the mold can be pretreated with an external mold release agent to facilitate removal of the part from the mold. The mold is advantageously preheated to a temperature of about 80°–250° F. After placing the reactants in the mold, they are permitted to rise and cure to a desired density. After the desired curing takes place (at least enough so that the foam maintains it shape after demolding, which is advantageously about 2 minutes to about 1 hour), the molded foam is removed from the mold and post cured, if necessary.

In making slabstock foam, it is common to mix all reactants simultaneously in a mixing head immediately prior to foaming. After a short mixing period, the reaction mixture is permitted to rise against its own weight and cure. The components are advantageously at a temperature of about 60° to about 120° F. when blended, and typically, no heat is applied other than that generated from the heat of reaction. Method for preparing molded and slabstock polyurethane foam are described, for example, in Polyurethane; Chemistry and Technology II, Technology by Saunders and Frisch, Interscience Publishers, 1964.

The resulting foam has good physical properties and excellent burn properties. For the purposes of this invention, burn properties (flame resistance) are evaluated using a vertical burn test such as described by the State of California Department of Consumer Affairs, Bureau of Home Furnishings, Technical Bulletin No. 117, REQUIREMENTS, TEST PROCEDURE AND APPARATUS FOR TESTING THE FLAME RETARDANCE OF RESILIENT FILLING MATERIALS USED IN UPHOLSTERED FURNITURE. January 1980 (Cal 117 test), incorporated by reference, and/or a horizontal burn test such as is described in 49 CFR 547.302, Standard No. 302; *Flammability of interior materials* (1984) (MVSS-302 test).

The following examples are provided to illustrate the invention, but are not intended to limit the scope thereof. All parts and percentages are by weight unless otherwise indicated.

EXAMPLES 1–2

In preparing the following foams, all ingredients except the polyisocyanate are thoroughly blended at room temperature. The polyisocyanate is then stirred in under high agitation, again at room temperature. The blend is poured into a 15"×15"×10" lined box, and is allowed to rise to full height. The foam is first placed in a ventilated cabinet for 24 hours and then allowed to cure for 7 days at ambient conditions prior to testing.

The resulting foams are tested for tensile and tear properties using standard methods. The other physical properties reported were also measured according to standard test methods, such as ASTM. The burn properties of each foam are measured according to the California Tech. Bull. No. 117 test, which is a vertical burn test. In this test a 12×3×½ inch piece of foam is exposed to a 1½ inch flame for 12 seconds. Both the distance up the 12 inch sample which is burned (char length) and the length of time the specimen continues to burn after removal of the ignition source (afterflame) are recorded. The results of the testing are reported as the average char distance, in inches, and after flame, in seconds, of five test specimens.

surfactant (B8681, sold by Goldschmidt) (0.4 parts), an amine catalyst (a 3:1 mixture of a catalyst comprising 33 parts triethylenediamine and 67 parts dipropylene glycol and a catalyst comprising 70 parts bis(dimethylaminoethyl)-ether, sold as Dabco™ 33LV by Air Products) (0.2 parts), tetrakis(2-chloroethyl)ethylene diphosphate (sold as Thermolin™ 101 by Olin Chemical Co. (2.0 parts), dibutyltin dilaurate (0.25 parts), and sufficient TDI to provide an isocyanate index of about 105, plus the components set forth in the table below. The resulting foams are tested in accordance with the procedures described in Examples 1–2.

| COMPONENTS | Ex. 1 | Ex. 2 | PROPERTIES | Ex. 1 | Ex. 2 |
|---|---|---|---|---|---|
| Polyol* | 100 | 100 | DENSITY (LBS/FTS) | 1.58 | 1.70 |
| H$_2$O | 2 | 2 | TENSILE (PSI) | 12.9 | 11.3 |
| CCl$_3$F | 14 | 14 | ELONGATION | 213 | 190 |
| diethanolamine | 1.4 | 1.4 | TEAR RESISTANCE (LBS/IN) | 1.3 | 1.4 |
| Amine catalyst (Dabco™ 33LV) | 0.25 | 0.25 | RESILIENCY (%) | 51 | 43 |
| dibutyltin dilaurate | 0.24 | 0.22 | 50% COMP. SET (%) | 12.2 | 9.9 |
| silicone surfactant | 1.4 | 1.4 | 75% COMP. SET (%) | 17.2 | 10.0 |
| 2° hydroxyl-containing polyol** | 2.3 | 2.3 | 90% COMP. SET (%) | — | — |
|  |  |  | 75% HACS | 73.0 | 17.1 |
| TDI | 30.10 | 30.10 | 25% ILD (LBS) | 10 | 10 |
| TDI INDEX | 100 | 100 | 65% ILD (LBS) | 21 | 26 |
| BLOW-OFF TIME (SEC.) | — | — | 25% R ILD (LBS) | 8 | 9 |
| CAL 117 #PASS/5 TESTED | 5 | 5 | % HYSTERESIS | 80.0 | 81.7 |
| AVG CHAR (IN)/AVG AFTERFLAME (SEC.) | 2.16/0.00 | 2.44/0.00 | MODULUS (%) | 2.05 | 2.49 |
|  |  |  | AIR FLOW (CFM) | 0.95 | 3.2 |

*a copolymer, polyol containing 12.5% by weight styrene/acrylonitrile particles, available from The Dow Chemical Company.
**a glycerine-initiated polypropyleneoxy polyol with a molecular weight of about 250, which is available from The Dow Chemical Company.

COMPARATIVE EXAMPLES 1–4, EXAMPLES 3–14

Using the procedure of Examples 1–2, foams are prepared from 100 parts of the SAN polyol of Examples 1 and 2, diethanolamine (0.75 parts), water (2.4 parts), a silicone

| Foam# | C.E. 1 | 3 | 4 | 5 | 6 | 7 | 8 |
|---|---|---|---|---|---|---|---|
| Polyol A*, parts | — | 0.4 | 1.1 | 1.9 | — | — | — |
| Polyol B**, parts | — | — | — | — | 1.0 | 3.0 | 5.0 |
| Density, pcf | 2.31 | 2.29 | 2.30 | 2.36 | 2.32 | 2.30 | 2.54 |
| Tensile, psi | 20.6 | 20.5 | 18.9 | 18.7 | 20.5 | 18.3 | 16.0 |
| Elongation, % | 151 | 153 | 134 | 135 | 157 | 141 | 143 |
| Tear Res, lbs/in | 2.9 | 1.8 | 1.7 | 1.5 | 1.5 | 1.7 | 1.6 |
| Resiliency, % | 57 | 53 | 55 | 56 | 54 | 53 | 51 |
| Comp Set, 90% | 4.6 | 4.3 | 4.3 | 4.4 | 4.4 | 5.7 | 6.4 |
| 25% ILD | 35 | 36 | 38 | 42 | 36 | 34 | 36 |
| 65% ILD | 73 | 75 | 78 | 91 | 75 | 71 | 80 |
| rtn. to 25% | 28 | 28 | 29 | 32 | 28 | 26 | 28 |
| % Hysteresis | 78 | 78 | 77 | 76 | 78 | 76 | 77 |
| Modulus | 2.08 | 2.08 | 2.07 | 2.15 | 2.07 | 2.08 | 2.22 |
| Air flow (cfm) | 1.14 | 1.5 | 1.9 | 1.6 | 1.4 | 2.1 | 1.9 |
| CAL 117:avg char, in. | 6.74 | 2.94 | 2.32 | 1.88 | 4.44 | 2.06 | 2.18 |
| avg afterflame, sec. | 9.53 | 3.48 | 1.58 | 1.16 | 8.88 | 0.00 | 0.35 |

*Polyol A - an amino ethyl ethanolamine-initiated poly(propyleneoxy) polyol with a molecular weight of about 280.
**Polyol B - a tetra(hydroxypropoxypropyl) hydrazine.

| Example | CE 2 | CE 3 | CE 4 | CE 5 | 9 | 10 | 11 | 12 | 13 | 14 |
| --- | --- | --- | --- | --- | --- | --- | --- | --- | --- | --- |
| Polyol C***, parts | — | 1.1 | 3.2 | 5.4 | — | — | — | — | — | — |
| Polyol D****, parts | — | — | — | — | 0.8 | 2.5 | 4.1 | — | — | — |
| Polyol E*****, parts | — | — | — | — | — | — | — | 0.5 | 1.4 | 2.3 |
| Density, pcf | 2.34 | 2.30 | 2.34 | 2.30 | 2.24 | 18.2 | 2.48 | 2.24 | 2.22 | 2.24 |
| Tensile, psi | 21.6 | 20.6 | 22.6 | 23.9 | 19.4 | 183 | 17.3 | 20.5 | 19.6 | 20.2 |
| Elongation, % | 182 | 172 | 203 | 245 | 174 | 1.7 | 151 | 191 | 166 | 164 |
| Tear Res, lbs/in | 1.9 | 1.9 | 2.1 | 2.6 | 1.7 | 1.7 | 1.2 | 1.9 | 1.6 | 1.6 |
| Resiliency, % | 59 | 57 | 55 | 50 | 59 | 58 | 56 | 59 | 57 | 52 |
| Comp Set, 90% | 4.7 | 5.0 | 5.8 | 6.5 | 5.8 | 6.7 | 7.3 | 5.9 | 6.2 | 6.4 |
| 25% ILD | 36 | 36 | 35 | 31 | 31 | 27 | 32 | 33 | 35 | 36 |
| 65% ILD | 75 | 75 | 72 | 64 | 65 | 58 | 71 | 69 | 71 | 74 |
| rtn. to 25% | 28 | 28 | 27 | 24 | 25 | 22 | 25 | 26 | 27 | 27 |
| % Hysteresis | 78 | 77 | 77 | 77 | 79 | 79 | 78 | 78 | 77 | 75 |
| Modulus | 2.08 | 2.06 | 2.06 | 2.09 | 2.08 | 2.09 | 2.18 | 2.06 | 2.04 | 2.05 |
| Air flow (cfm) | 1.17 | 1.10 | 1.21 | 1.19 | 1.50 | 1.77 | 1.41 | 1.25 | 1.16 | 1.50 |
| CAL 117:avg char, in. | 4.36 | 6.74 | 8.36 | 8.38 | 3.54 | 2.30 | 2.26 | 2.90 | 1.98 | 1.94 |
| avg afterflame, sec. | 8.19 | 17.10 | 19.38 | 19.47 | 6.20 | 1.57 | .65 | 3.54 | .86 | 1.86 |

Polyol C***-a polypropyleneoxy diol with a molecular weight of about 390.
Polyol D****-a polypropyleneoxy triol with a molecular weight of about 450.
Polyol E*****-a polypropyleneoxy triol with a molecular weight of about 250.

What is claimed is:

1. A flexible polyurethane foam prepared by reacting an aromatic polyisocyanate with an active hydrogen-containing composition, in the presence of a blowing agent, wherein the active hydrogen-containing composition comprises:
   (a) a polyol having an average functionality of about 2.0 to about 4.0, and an equivalent weight in the range of from about 500 to about 5000;
   (b) from about 0.5 to about 5 parts, per 100 parts by weight of component (a), of a crosslinker selected from the group consisting of monoethanolamine, diethanolamine, triethanolamine, monoisopropanolamine, diisopropanolamine, methylene bis(o-chloroaniline) and mixtures thereof; and
   (c) a compound having at least 3 hydroxy groups, at least two of which are secondary hydroxyl groups and an equivalent weight of less than about 500, which is present in an amount which is (i) in the range of from about 0.3 to about 5 parts per 100 parts by weight of component (a) and (ii) at least about 15 meq. of compound per 100 grams of component (a).

2. The foam of claim 1, wherein the polyisocyanate is 2,4- or 2,6-toluenediisocyanate, or a mixture thereof.

3. The foam of claim 1, wherein the polyisocyanate is 4,4'-diphenylmethanediisocyanate.

4. The foam of claim 1, wherein the polyol contains a dispersion of styrene/acrylonitrile copolymer particles.

5. The foam of claim 4 wherein the polyol contains 3–45 weight percent styrene/acrylonitrile copolymer particles.

6. The foam of claim 1 wherein the crosslinker is diethanolamine.

7. The foam of claim 1 wherein component (c) has an equivalent weight of no greater than about 300.

8. The foam of claim 1 wherein component (c) has at least three secondary hydroxyl groups.

9. The foam of claim 1 wherein component (c) has three hydroxyl groups, two of which are secondary hydroxyl groups.

10. Flexible polyurethane foam prepared by reacting an aromatic polyisocyanate with an active hydrogen-containing composition in the presence of a blowing agent, wherein the active hydrogen-containing composition comprises,
   (a) a polyol having an average functionality of about 2.0 to about 4.0, and an equivalent weight in the range of from about 500 to about 5000;
   (b) from about 0.5 to about 5 parts, per 100 parts by weight of component (a), of a crosslinker selected from the group consisting of monoethanolamine, diethanolamine, triethanolamine, monoisopropanolamine, diisopropanolamine, methylene bis(o-chloroaniline) and mixtures thereof; and
   (c) a compound having at least 3 hydroxy groups, at least two of which are secondary hydroxyl groups and an equivalent weight of less than about 200, which is present in an amount which is (i) in the range of from about 0.3 to about 5 parts per 100 parts by weight of component (a) and (ii) at least about 15 meq. of compound per 100 grams of component (a);
wherein component (c) is prepared by polymerizing propylene oxide or butylene oxide, mixtures thereof, or mixtures of propylene oxide and/or butylene oxide with ethylene oxide, in the presence of an initiator compound with a functionality of 3 or greater, or by reacting a primary hydroxyl-terminated compound with propylene oxide or butylene oxide.

11. The composition of claim 10 wherein component (c) has an equivalent weight of no greater than about 150.

12. The composition of claim 10 wherein component (c) has an equivalent weight of no greater than about 100.

13. The composition of claim 10 wherein compoent (c) is in an amount of at least about 1 part per 100 parts by weight of component (a).

14. A flexible polyurethane foam prepared by reacting a polyisocyanate with the active hydrogen-containing composition of claim 10, in the presence of a blowing agent.

15. The foam of claim 10, wherein the polyisocyanate is 2,4- or 2,6-toluenediisocyanate, or a mixture thereof.

16. The foam of claim 10, wherein the polyisocyanate is 4,4'-diphenylmethanediisocyanate.

* * * * *